United States Patent [19]

Buhl et al.

[11] Patent Number: 5,153,902
[45] Date of Patent: Oct. 6, 1992

[54] MULTI-EXCHANGE PAGING SYSTEM FOR LOCATING A MOBILE TELEPHONE IN A WIDE AREA TELEPHONE NETWORK

[75] Inventors: Nancy Buhl; John Hayes, both of Montreal, Canada; Harald Kallin, Sollentuna, Sweden

[73] Assignee: Telefonaktiebolaget L M Ericsson, Stockholm, Sweden

[21] Appl. No.: 516,122

[22] Filed: Apr. 27, 1990

[51] Int. Cl.$^5$ .......................................... H04M 11/00
[52] U.S. Cl. .......................................... 379/57; 379/60
[58] Field of Search ............... 379/56, 57, 59, 60, 379/58

[56] References Cited

U.S. PATENT DOCUMENTS

| | | | |
|---|---|---|---|
| 4,112,257 | 9/1978 | Frost | 379/60 |
| 4,644,351 | 2/1987 | Zabarsky et al. | 340/825.44 |
| 4,700,374 | 10/1987 | Bini | 379/60 |
| 4,737,978 | 4/1988 | Burke et al. | 379/60 |
| 4,815,078 | 3/1989 | Grauel et al. | 370/95 |
| 4,827,499 | 5/1989 | Warty et al. | 379/58 |
| 4,833,702 | 5/1989 | Shitara et al. | 379/60 |
| 4,843,622 | 6/1989 | Yotsutani et al. | 379/59 |
| 4,876,738 | 10/1989 | Selby | 379/59 |
| 4,881,271 | 11/1989 | Yamauchi et al. | 455/56 |
| 4,890,315 | 12/1989 | Bendixen et al. | 379/59 |

Primary Examiner—James L. Dwyer
Assistant Examiner—Dwayne D. Bost
Attorney, Agent, or Firm—Johnson & Gibbs

[57] ABSTRACT

A mobile communications system in which a mobile subscriber may roam includes a number of exchanges having coverage areas in which the mobile subscriber may roam. An interrogation exchange receives incoming calls to the mobile subscriber and requests information as to the location of the mobile subscriber from its home exchange. The home exchange includes a list of a plurality of possible exchanges in which the mobile subscriber may be located which is used to supply information as to the location of the mobile subscriber. The home exchange initiates and coordinates the paging process and reacts according to the outcome of this process.

24 Claims, 2 Drawing Sheets

MULTI-EXCHANGE PAGING SYSTEM FOR LOCATING A MOBILE TELEPHONE IN A WIDE AREA TELEPHONE NETWORK

CROSS REFERENCE TO RELATED APPLICATION

This application is related to the U.S. Patent Application entitled "APPARATUS AND METHOD FOR DIRECTING CALLS TO MOBILE TELEPHONE SUBSCRIBERS", Ser. No. 07/515,836, filed on even date herewith and assigned to the assignee of the present invention, which application is hereby incorporated herein by reference.

BACKGROUND OF THE INVENTION

1. Field Of The Invention

The present invention relates to mobile radio telephone systems and, more particularly, to a method and apparatus for locating a mobile telephone within a wide geographic area covered by a mobile telephone service network.

2. History Of The Prior Art

The goal of a mobile telephone system is the interconnection of mobile telephone users ("mobile subscribers" or "mobile units") with the extensive public switched telephone network ("PSTN"). Successful achievement of this goal requires that each mobile subscriber in the system be made available to anyone who has a telephone, whether fixed or mobile. Hence, the problem of locating a mobile subscriber moving from one area to another (a "roaming subscriber") within a wide geographic area has become of primary importance.

Solutions to this problem are based upon the concept of mobile registration. Mobile registration is the process by which a mobile telephone unit becomes listed as being present in the service area of one of the mobile exchanges in a mobile telephone service network. As each mobile telephone unit enters a new area within the network, it transmits a unique identity signal which is detected by the mobile exchange associated with that area.

In one variation of the solution, the receiving exchange records an indication of the presence of the mobile unit in its memory and then informs all the other exchanges of the presence of the mobile unit within its coverage area at that particular moment. When the mobile unit crosses over into another area, the exchange associated with that area, upon receiving an identity signal from the telephone unit, will record an indication of the mobile unit's presence there and then transmit the identity signal to all of the other exchanges together with its own identity signal, for the purpose of updating the mobile unit's position.

In another variation of the solution, a mobile unit's identity and position messages are sent by each exchange, whose respective areas is crossed by such unit, to a specific center. Any exchange in the mobile network which contacts this center may receive all the information necessary for locating and making a connection to the mobile unit. This solution eliminates the need to advise one or more of the other mobile exchanges each time a mobile unit enters a new area without making or receiving a call there and thereby reduces the amount of mobile unit location data that must be processed by each of the mobile exchanges within the mobile network. In some systems, the aforementioned center may be a common national center such as that used in the mobile telephone location system disclosed in U.S. Pat. No. 4,700,374 issued to Bini. In other systems, the center may be the exchange to which a mobile unit is assigned (the "home" exchange). In such other systems, the mobile subscriber may preregister in an area other than the home area (i.e. the normal service and billing area) for service to be provided in the other ("visited") area. When a roaming subscriber arrives in the visited area, the mobile unit is qualified to make telephone calls from there and calls which are received in the mobile unit's home area are forwarded to the visited area for transmission to the mobile subscriber. Qualification of a mobile unit in a visited area may be automatically performed when the roaming subscriber appears in the visited area and the mobile unit is switched on, e.g. when the user initiates a first telephone call. The roaming mobile unit automatically transmits its identification number to the visited exchange and requests roamer service. If the roaming subscriber is a visitor from a cooperating exchange, the visited exchange provides service to the roaming subscriber by allocating a temporary roamer number to it. The visited exchange also notifies the roaming subscriber's home exchange of the roaming subscriber's location in the coverage area of the visited exchange. The roaming subscriber's identification number is then entered into a list of roamers in the home exchange so that incoming calls to the roaming subscriber are forwarded to the visited exchange where the roaming subscriber is then located.

Heretofore, proper routing of telephone calls to mobile subscribers has required that each mobile subscriber be registered exclusively in one of the local areas. Whenever a mobile subscriber moved from one local area to another, its registration in the local area from which the mobile subscriber had just departed was automatically cancelled and a new registration was established in the local area in which the mobile subscriber had just arrived. The list of roamers in the roaming subscriber's home exchange was then updated to reflect its new location. The home exchange, therefore, kept track of only one location, i.e. the visited area in which the mobile subscriber most recently registered, for each roaming subscriber at any particular moment.

While the single location concept underlying prior art roaming subscriber registration systems is consistent with physical reality, it does not fully take into account some of the limitations of radio technology. Often in prior art systems, telephone calls to a roaming subscriber were lost because the mobile subscriber was registered in one area but was actually located in another area. For example, a registration access signal sent by a roaming subscriber actually located in one visited exchange may be overheard by one or more other neighboring exchanges resulting in a plurality of cooperating exchanges registering the subscriber as a visitor and further resulting in incorrect location data updating in the home exchange of the roaming subscriber. In addition, a mobile may, in the processing of registering, rescan and inadvertently accesses a control channel associated with an exchange which is different from the one in which it is actually located. After registering on that channel the mobile again rescans and may retune to a control channel which is not in the same exchange in which it has just registered. However, the actual physical location of the mobile is unknown to the home exchange which has recorded the location from where the earlier registration was made. Because prior are systems automatically routed incoming calls to only the registered location of the roaming subscriber, for any call in which the registered location of the subscriber was incorrect the call was not completed. In addition, system resources were unnecessarily occupied whenever the call was not completed. The present invention dramatically increases the probability that a call will be completed to a subscriber even though its registered location was incorrect. This also minimizes the unnecessary waste of PSTN and mobile system resources. The known prior art fails to teach or suggest a multi-exchange paging system as set forth in the description of the present invention herein. For example, U.S. Pat. No. 4,843,622 issued to Yotsutani, et al. discloses a communication control unit capable of searching for a called telephone set in a mobile radio telephone network covering an area divided into a plurality of zones, each having a radio communication device assigned thereto. The specific searching operation classifies the zones into at least two groups so that at least one of the groups consists of a plurality of the zones. Searching proceeds by successively transmitting the incoming call signal to each group of zones until a response signal is received.

The Yotsutani approach apparently presumes a coverage area that is within the limits of a factory or a corporate headquarters and a location information signal for a specific telephone set which is static in the memory of the control unit. The efficiency of the searching operation disclosed by Yotsutani is a function of the size and number of the groups of zones which must be searched before a response signal is received. Hence, as the coverage area expands and the number of zones increases commensurate therewith, the efficiency of the searching operation decreases dramatically. In a wide area mobile telephone system providing for dynamic registration of roaming subscribers, searching one local area after another for each subscriber would strain the capacity of the network and would defeat the purpose of mobile registration.

SUMMARY OF THE INVENTION

In one aspect of the present invention, a mobile radio telephone network includes a plurality of mobile telephone exchanges with each exchange assigned to one of a plurality of local areas. The network also includes a plurality of mobile subscribers, each associated with one of the exchanges. A page controller is incorporated into each of the exchanges and includes a memory for storing, in correspondence with each one of the mobile subscribers associated with the exchange containing the page controller, a list of locations where each one of the mobile subscribers may possibly be found. A first means for detecting the arrival of an incoming call signal indicates that a call has been placed to a specific one of the mobile subscribers. A paging means is coupled to the first detecting means for paging the specific mobile subscriber in one or more locations indicated by the list of locations corresponding to the specific mobile subscriber. A second means is coupled to the paging means for detecting a page response sent by the specific mobile subscriber.

In another aspect of the present invention, the list of locations for each mobile subscriber stored in the memory of the page controller includes the current registered location of the mobile subscriber and at least one of the locations where the mobile subscriber has been previously registered, the locations in which the mobile subscriber has originated calls and the locations in which the mobile subscriber has transmitted a page response.

In yet another aspect of the present invention, a method of locating a specific mobile subscriber within a mobile radio telephone network includes the step of detecting an incoming call indicating that a call has been placed to the specific mobile subscriber. The specific mobile subscriber is then paged in one or more locations indicated by a list of possible locations stored in a memory and a page response, transmitted by the specific mobile subscriber in a specific one of the one or more locations being paged, is detected. The call is thereafter routed to the specific mobile subscriber in the specific location. The paging step may include simultaneously paging in the one or more locations, sequentially paging in the one or more locations or a combination of simultaneous and sequential paging.

BRIEF DESCRIPTION OF THE DRAWINGS

The present invention will be better understood and its numerous objects and advantages will become apparent to those skilled in the art by reference to the following drawings in which.

DETAILED DESCRIPTION

Figure 1:
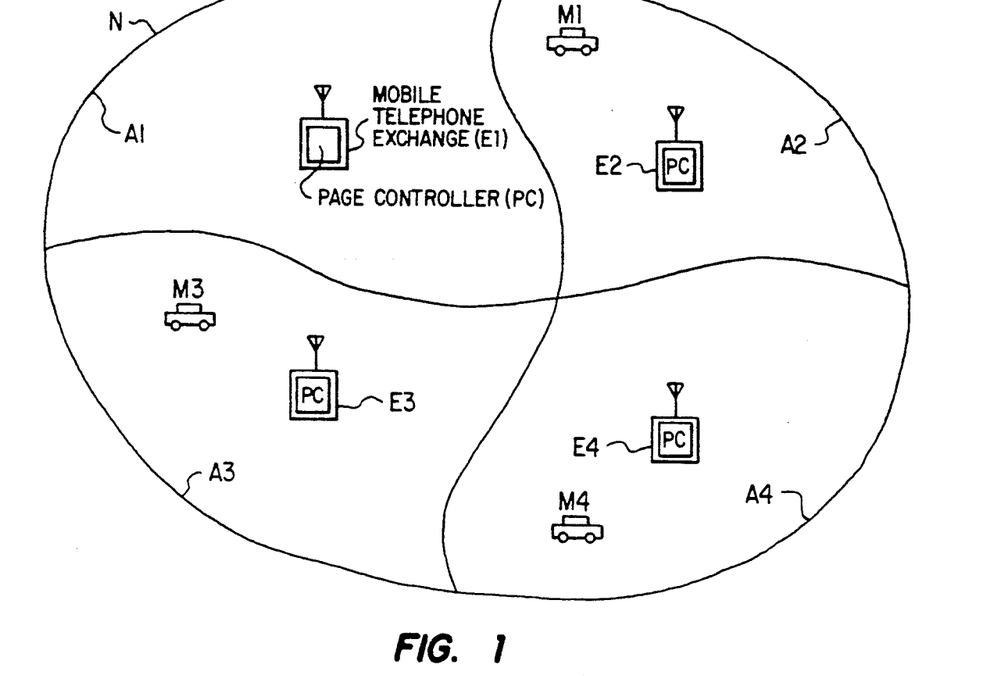
FIG. 1 is a schematic diagram of a mobile telephone network showing a page controller according to the present invention.

Referring first to FIG. 1, there is illustrated therein a mobile radio telephone network N according to the teachings of the present invention. The network may be seen to comprise a plurality of mobile telephone exchanges E1-E4 assigned to a plurality of local service areas A1-A4 in which a plurality of mobile units M1-M4 may be found. Each of the plurality of mobile exchanges E1-E4 provides telephone coverage for one of the plurality of service areas A1-A4. Thus, for example, the mobile exchange E1 provides telephone coverage in the area A1, the mobile exchange E2 provides telephone coverage within the area A2, and so forth. Each of the mobile units M1-M4 is associated with one of the exchanges E1-E4. Thus, E1 may be considered the home exchange of M1; E2 the home exchange of M2; and so forth. It may be recognized from the preceding description of prior art that the designation of a home exchange for each mobile unit in a mobile radio telephone network is a matter well known in the art. It may also be recognized that, in practice, a plurality of mobile units are associated with each home exchange. However, for clarity and convenience, only one of such plurality of units is shown in FIG. 1 and discussed herein. Similarly, it may be recognized that while the network N is seen in FIG. 1 to be divided into four local areas, in practice, the number of local areas in a network may be any number.

Each of the local areas A1-A4 is allocated plurality of voice or speech channels and at least one access or control channel. An example of the operation of these channels in prior art systems may be seen in U.S. Pat.

Nos. 4,737,978 and 4,843,622, which are hereby incorporated by reference. Of particular relevance to the present invention is the access or control channel which has been traditionally used to control the operation of mobile units by means of data messages transmitted to and received from those units. Such data messages include incoming call signals, outgoing call signals, page signals, page response signals and location registration signals. The term "page" or "page signal" is used hereinafter to mean a data message which informs a mobile unit that someone is attempting to call the mobile unit. The term "page response" or "page response signal" is used hereinafter to mean a data message transmitted by a called mobile unit which verifies or indicates that the called mobile unit can accept the call.

Referring again to FIG. 1, it may be seen that the mobile unit M1 has travelled from its home area A1 to the adjacent local area A2. Thus, in accordance with the terminology used in the art, the mobile subscriber M1 may be classified as a roaming subscriber and the mobile exchange E2 associated with the area A2 may be classified as a visited exchange with respect to M1.

In exemplary prior art systems, whenever a call was placed to a roaming subscriber, for example, by an ordinary PSTN subscriber, the PSTN routed the call to a mobile exchange qualified as an entry into the mobile telephone network. Such an entry exchange is commonly referred to in the art as an interrogation exchange. The interrogation exchange then requested call routing information from the called subscriber's home exchange. Upon receiving the routing request from the interrogation exchange, the home exchange generated call routing information by accessing from its memory the current registered location for the called roaming subscriber. Based on this information, the call was routed to the visited exchange indicated by the location registration data stored in the memory of the home exchange. Once the incoming call was received in the visited exchange, a page was broadcast by the visited exchange to the called mobile subscriber. Upon receiving the page signal, the mobile unit transmitted a page response to the visited exchange and a voice connection was then established on one of the voice channels.

As previously mentioned, however, the visited exchange within prior art systems was sometimes unable to make the connection to a roaming subscriber and the call was therefore lost. This was generally caused by the fact that the called subscriber was not actually present in the coverage area of the visited exchange at the time the page was broadcast and therefore could not have returned a page response at that particular moment. In other words, the registered location of the called subscriber did not always accurately reflect the physical location of the mobile subscriber at that moment. This is a major deficiency and shortcoming of existing systems which is overcome by the present invention.

Another deficiency and shortcoming which is overcome by the present invention relates to what is generally described by those skilled in the art as an "unknown page response". Whenever one mobile exchange broadcasts a page to a specific mobile subscriber, the specific mobile unit scans the available control channels in the area where it is located to determine which of these channels is best suited for carrying its page response. In some instances, the channel selected by the mobile unit for sending the page response has been dedicated to an exchange other than the exchange which originated the page. This other exchange would not recognize the page response and would therefore either disregard the page response or would attempt to redirect the mobile unit to one of the control channels serving the exchange which originated the page. One approach to trying to solve the unknown page response problem which has been proposed in the art is to have the exchange which received the unsolicited page response instruct the mobile to respond again on a different channel which is hopefully associated with the exchange which sent the page request. This approach is referred to as "directed retry upon unknown page response" but has not proven to be very successful in practice. By contrast, the present invention provides for the advantageous use of an unknown page response in locating a specific mobile subscriber and setting up a call directly to it.

Returning briefly to FIG. 1, it may be seen that each of the mobile exchanges E1-E4 includes a page controller PC represented in block diagram form within each of the mobile exchanges E1-E4. Each page controller PC within each one of the exchanges E1-E4 retains a list of locations where the mobile subscribers associated with that exchange may possibly be found. Thus, for example, the PC within E1 would retain a list of locations where the mobile subscriber M1 may possibly be found. In like manner, the PC within E2 would retain a list of locations where the mobile subscriber M2 may possibly be found, and so forth. The list of locations in each PC may contain, in addition to the current registered location of each mobile subscriber, the locations in which the mobile subscriber has been previously registered; the locations from which the mobile subscriber has made calls without being registered there; the locations from which the reception of an unknown page response has been reported and any other locations where the associated mobile subscriber may conceivably be found. In effect, the home exchange of a mobile subscriber retains not only its current registered location but also an "uncertainty" list of possible locations which may also be searched for the mobile subscriber. This uncertainty list of locations comprises locations in which the presence of the mobile subscriber has been recently detected and can therefore lead to identifying the true location of the mobile subscriber if it is not found in the current registered location. It should be noted that it may be desirable to limit the list of possible subscriber locations to those at which the subscriber may practically be located in order to avoid undue waste of processing resources. Various algorithms would be used to maintain such a list.

Figure 2:
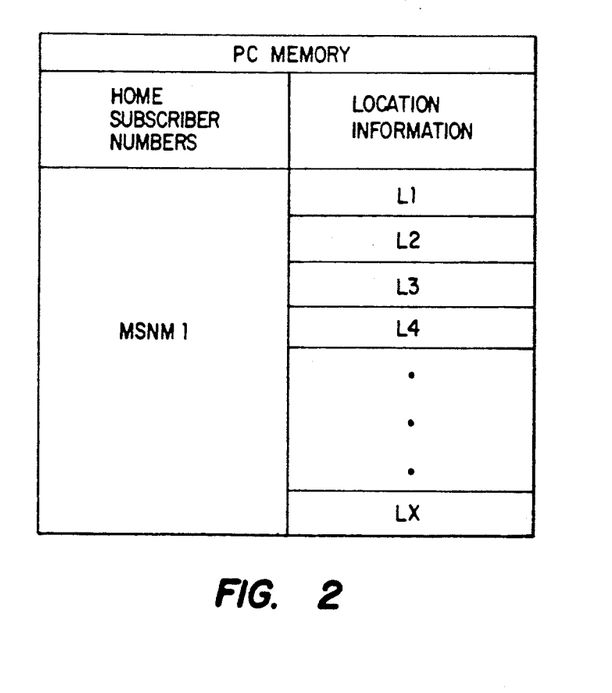
FIG. 2 is a pictorial representation of the memory of the page controller shown in FIG. 1.

Referring next to FIG. 2, a pictorial representation of a PC memory may now be seen. The PC memory may be constructed from a RAM (Random Access Memory) as is well-known in the art. The left hand column of FIG. 2 represents a plurality of mobile subscribers ("home subscribers") belonging to the particular home exchange with which the PC memory is associated. It is conventional in the art to assign each mobile subscriber a unique phone number within its home exchange which distinguishes that subscriber from others and allows selective connection and communication with each mobile subscriber within the mobile telephone network. Such phone numbers are designated as home subscriber numbers in FIG. 2. Associated with each of the home subscriber numbers is a corresponding plurality of location information data L1-LX as indicated in the right hand column of FIG. 2. The location information data L1-LX represents the list of locations where the particular home subscriber with the associated home subscriber number may possibly be found. Thus, L1 for example, may represent the current registered location of the home subscriber; L2 may represent a particular location in which the home subscriber has been registered before; L3 may represent a particular location where the home subscriber has previously made calls without being registered there; L4 may represent a particular location in which an unknown page response has been previously received; and so forth. The PC memory depicted in FIG. 2 is the memory of the PC within E1. The exemplary home subscriber M1 is assigned a home subscriber number MSNM1. Associated with the home subscriber number MSNM1 in the PC memory of E1 is a list of locations L1-LX where M1 may possibly be found. It should be understood that, for purposes of convenience and clarity, the exemplary list of locations L1-LX illustrated in FIG. 2 represents those locations which are associated with only one home subscriber of E1, i.e. the list of locations associated with M1. In practice, however, the PC memory of a home exchange will contain numerous lists of locations, each associated with a corresponding one of the exchange's home subscribers.

It should be understood that while the PC memory referred to above has been discussed as being part of the page controller associated with every exchange, the same memory might be located in a home location register (HLR). Such an HLR can be a subscriber data memory for storing information on a plurality of subscribers.

In embodiments of the present invention, as discussed above and further illustrated in FIG. 4 discussed below, the home exchange 8 maintains an uncertainty list which is used to keep track of where the mobile station 12 might be if it cannot be found where the home exchange believes the mobile station is most likely to be. Various factors influence the updating of the uncertainty list, and, the reasons for including a particular exchange on the list is based upon knowledge acquired from earlier events.

In order to keep the list as short and as fresh as possible, all entries may be time supervised, for example, entries are taken off of the list if the mobile station has not registered within the exchange within a certain period of time.

Figure 3:
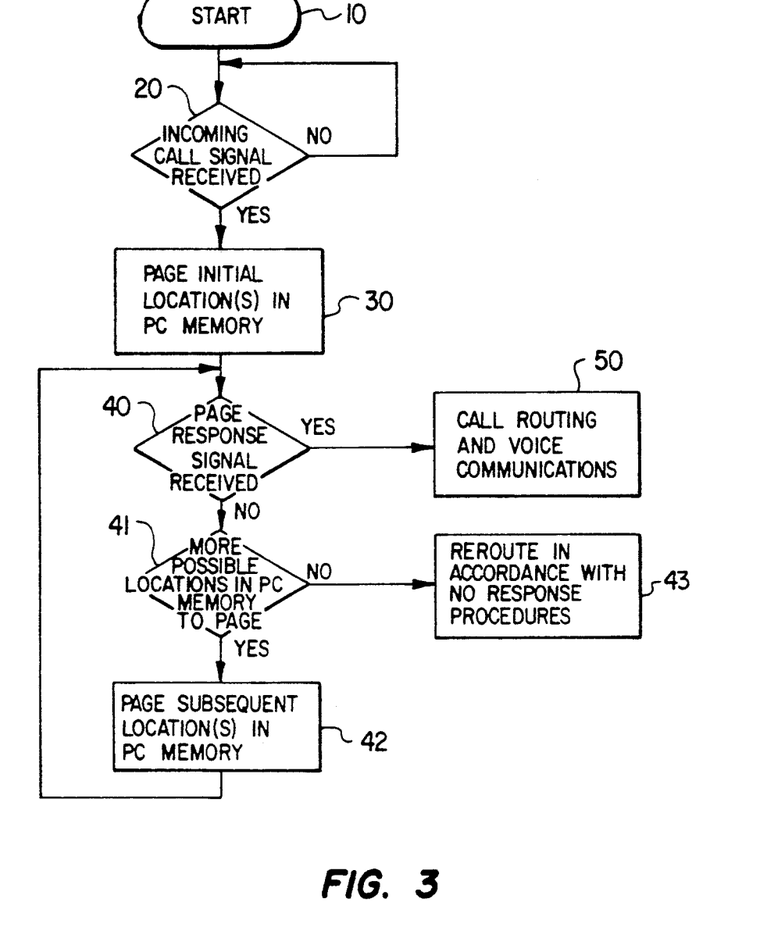
FIG. 3 is a simplified logic flow chart showing the operation of the page controller shown in FIG. 1.

Referring next to FIG. 3, there is shown a logic flow chart executed by a page controller PC according to the present invention. The process of locating a home subscriber is entered into at start block 10. At decision block 20, the PC determines whether an incoming call signal to a home subscriber has been detected. An affirmative decision leads to block 30 and a paging operation commences. At block 30, the home exchange requests paging in one or more of the locations indicated by the list of locations stored in the PC memory. Such a page request is addressed to the mobile exchange assigned to each of such one or more locations contained within the list. The home exchange may execute simultaneous, sequential or a combination of both simultaneous and sequential paging in a plurality of different locations indicated by the list within the PC memory. For example, the home exchange may initially page a called home subscriber in the location in which the called home subscriber is currently registered, i.e. the location where the home subscriber is believed to be located. At block 40, the home exchange determines whether a page response has been received from the subscriber. An affirmative decision leads to block 50 and the call is routed to the exchange which received the page response. If a page response is not received in the initially paged location(s), however, a NO branch is taken from the block 40 to the block 41 at which the system determines whether there are additional possible locations on the list in the PC memory. If so, the system moves to block 42 and proceeds to execute simultaneous paging in some or all of the other locations indicated by the remaining list of locations contained within the PC memory. Alternatively at 42, the home exchange may execute sequential paging starting with the location in the uncertainty list in which the roaming subscriber is most likely to be found and proceeding to page in the next most likely location, and so on, until a page response is received. If a page response signal is received at 40, call routing and voice communication are established, at 50 following receipt of the page response signal from the called mobile subscriber. If however, no page response signal is received by the system after all of the possible locations in the PC memory have been paged the system reroutes the call in accordance with no response procedures at 43.

The technique of call routing until after a mobile has responded to a page is set forth in co-pending U.S. Patent Ser. No. 07/515,836, filed Apr. 27, 1990 and assigned to the assignee of the present invention which is incorporated by reference herein. In this call routing technique an interrogation exchange receives incoming calls for a mobile station and requests information from the home exchange as to where to route the call. Before returning this information to the interrogation exchange, the home exchange requests the exchange(s) where the mobile is believed to be currently located to page the mobile. Upon reception of a page response from the paged mobile, and after possible voice channel designation, the present location of the mobile is reported to the home exchange. The home exchange then informs the interrogation exchange of the mobile's present location for routing and completion of the call.

With a change in call routing philosophy from "route first, page later" to "page first, route later," the calling subscriber should not notice any change in call set up time. Since in this new call routing technique the home exchange requests that the mobile be paged and confirmed on a voice channel before releasing the routing information, as opposed to the prior art technique of just requesting and retrieving routing information, the time during which the home exchange is controlling the call set up process has been substantially increased. In addition, if the page requests are sent to multiple exchanges, depending upon the paging philosophy used, i.e., sequential, simultaneous or a combination thereof, the time during which the home exchange is controlling the paging process may again be increased. Since the call setup time perceived by the calling subscriber may also increase, additional events which may now occur during this expanded time period in the home exchange should also be addressed. For example, if the calling subscriber hangs up during this time, the paging process should be terminated in order to save paging resources. Further, the interrogation exchange should inform the home exchange that this event has occurred.

In cases where the home exchange incorporates a paging philosophy which will increase the perceived call setup time, the home exchange can order the interrogation exchange to notify the calling subscriber that paging is progressing instead of offering only complete silence. Such notification could be in the form of a recorded announcement until the called subscriber is found or until all exchanges that have received a paging request have given a negative response.

Although an announcement to the A-subscriber (the calling party) of the fact that paging is in progress may be desirable in the general case, it may not be necessary in multiexchange paging if enough flexibility, i.e., possibilities to restrict, is given for setting up paging administration. For example, it is possible to limit the maximum number of paged exchanges, to use parallel instead of sequential paging, and to limit the page response supervision times.

In the case that an indication of a registration from a mobile, indicating the mobile's current location, is received in the home exchange during the paging process, this new information should be considered and used to influence the paging process. For example, the next page request sent could be to the exchange from where the registration indication was received.

Since paging of a subscriber may take some considerable amount of time, it is important to treat other incoming calls to the subscriber properly. This is not only to avoid unnecessary paging but also to handle "call waiting" and "transfer on busy" conditions correctly. All incoming calls received for a specific mobile station during the paging process should be handled according to the outcome of the paging process. The called mobile station should not be indicated busy and the call routed accordingly just because the mobile station is being paged for a first call when a second call arrives.

In order to cater for multiexchange paging, the home exchange or the home location register (HLR) controls the paging of the mobile station and creates a centralized point from which it is possible to track a mobile station within the network. Alternatively, this task can be distributed to the visited exchange or to the interrogation exchange, although such distribution may reduce the flexibility of the system and would still have to involve the home exchange in several different situations anyway.

Figure 4:
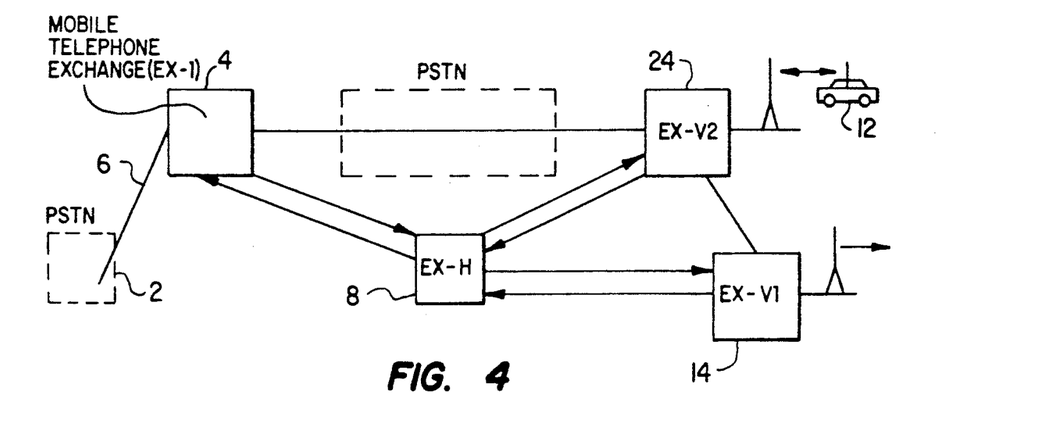
FIG. 4 is a block diagram illustrating multi-exchange paging in a routing system according to the teachings of the present invention.

Referring to FIG. 4 which illustrates multi-exchange paging in a routing system, if the mobile station 12 cannot be found in the first visited exchange in which paging is initiated, multi-exchange paging can continue paging the mobile in other exchanges where the mobile station 12 could be believed to be, for example, in the visited exchange 2, designated by reference numeral 24. Such a routing system is the subject of copending U.S. patent application Ser. No. 07/515,836, filed Apr. 27, 1990, assigned to the assignee of the present invention herein and incorporated by reference.

Referring in more detail to the multi-exchange paging process in the routing system of FIG. 4, if the mobile station 12 is initially believed to be in visited exchange V1 14 but the page response back to the home exchange 8 from V1 indicates no response by the mobile, the home exchange 8 repeats the page request to another exchange V2 24 where the mobile station 12 might be located at the moment. If the mobile station 12 is found and can be brought to a voice channel, the call is then routed to the visited exchange V2 24. Paging in exchanges other than the first choice exchange can be done in parallel or in a selected sequential order. In the event the mobile subscriber cannot be located within any exchange, the interrogation exchange can notify the calling party of call failure without any routing having been attempted, thus preserving valuable system resources.

Paging is initially requested in visited exchange V1 14 since, in the system's opinion, that visited exchange is the most likely current location of the mobile station. The request to continue searching for the mobile station in other exchanges, if it is not found in the system's first choice of possible locations, is controlled by the home exchange which bases the paging decisions on the information stored in the "uncertainty list" stored in the home exchange and discussed above.

The system should also ensure that areas are not unnecessarily paged repeatedly. That is, if an extended paging area (as described in the above-referenced copending application) covers an area which is controlled by an exchange stored as a possible location in the uncertainty list, this area should not be paged twice due to the above combination.

Since paging requires substantial system capacity and the forward control channel is a limited resource, paging of mobile stations in several exchanges should generally be minimized. That is, the paging processes are controlled so that overload situations are avoided and the mobile station is still paged where it is most likely to reply to the page. Paging is already reduced in certain current systems by means of activity supervision wherein inactive subscribers are not paged and through use of location areas within each exchange so that paging only occurs where the mobile station is actually located. To further reduce the paging load as incorporated in the system of the present invention, specific area paging can be defined within each exchange to replace "global" paging.

In order to control enhanced incidence of paging in multiple-exchange paging it is useful to provide certain limitations on paging requests. If paging is requested in several exchanges, the system provides information and the paging request so paging is performed with maximum efficiency of system resources. In order to accomplish this goal there are a number of things to consider. First, the purpose of the paging request must be considered. If the page is being sent to where the system believes the mobile station is actually located, paging could have the highest priority and an unanswered page may be repeated in a paging area within or outside the exchange area. Second, page requests which are sent to exchanges where the system believes the mobile station may be located but which are on the uncertainty list could be a lower priority. In such cases, repeated paging may be restricted and the mobile only paged in one location. Third, if paging areas exist and extend outside of one exchange, a page request sent to a second exchange simply because it is part of a paging area extending outside of a first exchange must not in turn be allowed to extend outside the second exchange. Yet another thing that could be taken into account when determining the priority of page requests is the origin of the page request. That is, one operator may be of the opinion that another operator is sending too many page requests and may prefer that these be handled with a lower priority.

Finally, statistics on the number of page requests and the number of sent page requests based upon origin can be analyzed and used to determine priority of paging, especially in multiple operator environments. Operator commands could be used to specify the number of page repeats and the priority for different page requests and different operators.

The foregoing description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention.

What is claimed is:

1. In a mobile radio telephone network comprising a plurality of mobile telephone exchanges, each assigned to one of a plurality of local areas, said network further comprising a plurality of mobile subscribers, a page controller connected to each of said exchanges including:

means for storing, in correspondence with each one of the mobile subscribers, a list of locations where said each one of the mobile subscribers may possibly be found, said list comprising a most likely exchange identification and possible exchanges identifications;

first means for detecting the arrival of an incoming call signal indicating that a call has been placed to a specific one of said mobile subscribers; and paging means coupled to said first detecting means for paging said specific mobile subscriber in one or more locations indicated by said list of locations corresponding to said specific mobile subscriber, wherein said paging comprises issuing a page in said most likely exchange prior to issuing a page in said other possible exchanges, and wherein issuing a page in said other possible exchanges is effected simultaneously.

2. A page controller for a mobile radiotelephone network as set forth in claim 1 which also includes:

second means coupled to said paging means for detecting a page response sent by said specific mobile subscriber.

3. A page controller for a mobile radiotelephone network as set forth in claim 1 wherein each subscriber is associated with one of said exchanges and said page controller is located in each of said exchanges; and said storing means is located in a page controller associated with each exchange.

4. A page controller for a mobile radiotelephone network as set forth in claim 1 wherein said storage means is located in a page controller which is part of a home location register.

5. A page controller for a mobile radiotelephone network according to claim 1 wherein said list of locations includes the current registered location of said each one of the mobile subscribers and at least one of the locations where said each one of the mobile subscribers has been previously registered, has originated calls therefrom, or has transmitted a page response therefrom.

6. In a mobile radio telephone network, a method of locating a specific mobile subscriber comprising the steps of:

detecting an incoming call signal indicating that a call has been placed to said specific mobile subscriber;

paging said specific mobile subscriber in one or more locations indicated by a list of possible locations stored in a memory, said list comprising a most likely exchange identification and possible exchanges identifications;

detecting a page response transmitted by said specific mobile subscriber; and routing said call to said specific mobile subscriber in the specific location from which the page response was detected, wherein said paging comprises issuing a page in said most likely exchange prior to issuing a page in said other possible exchanges, and wherein issuing a page in said other possible exchanges is effected simultaneously.

7. A method of locating a specific mobile subscriber as set forth in claim 6 in which said page response is detected from a subscriber located in a specific one of said one or more locations being paged.

8. A method according to claim 6 wherein said step of paging includes simultaneously paging in said one or more locations.

9. A method according to claim 6 wherein said step of paging includes sequentially paging in said one or more locations.

10. A method according to claim 6 further including the steps of:

receiving an indication of a registration of said specific mobile subscriber in a particular location; and paging said specific mobile subscriber in said particular location.

11. A method of locating a mobile subscriber that may roam within the individual coverage areas of a plurality of exchanges comprising the steps of:

maintaining a list of at least two exchanges having coverage areas in which said mobile subscriber may be located, said list comprising a most likely exchange identification and possible exchanges identification; and issuing a page for said mobile subscriber in the coverage area of at least one of the exchanges on said list, wherein said paging comprises issuing a page in said most likely exchange prior to issuing a page in said other possible exchanges, and wherein issuing a page in said other possible exchanges is effected simultaneously.

12. A method as recited in claim 11 wherein said step of issuing a page comprises the step of simultaneously issuing a page in all exchanges on said list.

13. A method for directing a call from an interrogation exchange to a mobile subscriber within a mobile communications network that includes a home exchange for said mobile subscriber and a plurality of additional exchanges wherein said mobile subscriber may be presently located, the method comprising:

establishing a list of exchanges that includes information relating to said plurality of additional exchanges;

selectively paging said mobile subscriber within at least one of said home exchange and said plurality of additional exchanges on said list;

determining a present exchange within which said mobile subscriber is presently located;

reporting said present exchange to said home exchange; and routing said call from the interrogation exchange to said mobile subscriber within said present exchange.

14. A method for directing a call to a mobile subscriber as in claim 13 which includes the steps of:

notifying the calling party of call failure without routing of the call when the mobile subscriber cannot be located within an exchange.

15. A method for directing a call to a mobile subscriber as in claim 13 wherein the step of selectively paging said mobile subscriber comprises simultaneously paging in said plurality of additional exchanges.

16. A method for directing a call to a mobile subscriber as in claim 13 wherein the step of selectively paging said mobile subscriber comprises sequential paging in said plurality of additional exchanges.

17. A method for directing a call to a mobile subscriber as in claim 13 wherein the step of determining a present exchange within which said mobile subscriber is presently located comprises the step of detecting an page response from said mobile subscriber.

18. A method for directing a call to a mobile subscriber as in claim 13 wherein the step of determining a present exchange within which said mobile subscriber is presently located comprises the step of successfully connecting a voice channel to said mobile subscriber.

19. A page controller for locating a mobile subscriber associated with a home exchange in a cellular radio communications system, said page controller comprising:
- means for retrieving from a memory a plurality of values indicating the current registered location of said mobile subscriber and an uncertainty list of other possible locations in which the presence of said mobile subscriber has been recently detected; and
- means for initiating a page signal transmission in one or more of said locations after detection of a signal of an incoming call to said mobile subscriber and prior to routing of said incoming call to any of said locations,
- wherein said page controller is in said home exchange and said memory is in said page controller.

20. A page controller according to claim 19 further comprising means for updating said memory with new values indicating the new registered location of said mobile subscriber and other new locations in which the presence of said mobile subscriber has been recently detected.

21. A page controller according to claim 19 further comprising means for detecting said incoming call signal.

22. A page controller for locating a mobile subscriber associated with a home exchange in a cellular radio communications system, said page controller comprising:
- means for retrieving from a memory a plurality of values indicating the current registered location of said mobile subscriber and an uncertainty list of other possible locations in which the presence of said mobile subscriber has been recently detected; and
- means for initiating a page signal transmission in one or more of said locations after detection of a signal of an incoming call to said mobile subscriber and prior to routing of said call to any of said locations,
- wherein said page controller is in said home exchange and said memory is in said home exchange and said memory is in a home location register connected to said home exchange.

23. A page controller for locating a mobile subscriber associated with a home exchange in a cellular radio communications system, said page controller comprising:
- means for retrieving from a memory a plurality of values indicating the current registered location of said mobile subscriber and an uncertainty list of other possible locations in which the presence of said mobile subscriber has been recently detected; and
- means for initiating a page signal transmission in one or more of said locations after detection of a signal of an incoming call of said mobile subscriber and prior to routing of said incoming call to any of said locations,
- wherein said means for initiating a page signal transmission in one or more of said locations comprises:
  - first means for initiating said page signal transmission in said current registered location; and
  - second means for initiating said page signal transmission in said other possible locations in parallel with one another; and
  - third means for initiating said page signal transmission in said other possible locations in sequence with one another.

24. A page controller according to claim 23 further comprising means for detecting the receipt of a page response signal transmitted by said mobile subscriber and wherein said page signal is first transmitted in said current registered location and then transmitted in parallel, in sequence or in both parallel and sequence in said other possible locations until said page response signal is received from said mobile subscriber.

* * * * *

UNITED STATES PATENT AND TRADEMARK OFFICE
CERTIFICATE OF CORRECTION

PATENT NO. : 5,153,902
DATED : October 6, 1992
INVENTOR(S) : Buhl, Nancy et al.

It is certified that error appears in the above-indentified patent and that said Letters Patent is hereby corrected as shown below:

Column 3, line 1         Replace "are"
                             With --art--

Column 12, line 32       Replace "identification"
                             With --identifications--

Column 14, line 27       Replace the second occurrence of "of"
                             With --to--

Signed and Sealed this

Fourth Day of June, 1996

Attest:

BRUCE LEHMAN

*Attesting Officer*        *Commissioner of Patents and Trademarks*